United States Patent
Lundberg et al.

(10) Patent No.: US 6,760,757 B1
(45) Date of Patent: Jul. 6, 2004

(54) TECHNIQUES FOR USING A WEB BASED SERVER PROVIDED IN A VEHICLE

(75) Inventors: Olof Ingemar Lundberg, Weybridge (GB); Thomas Goerke, Stanmore (GB)

(73) Assignee: ICO Services, Limited, London (GB)

( * ) Notice: Subject to any disclaimer, the term of this patent is extended or adjusted under 35 U.S.C. 154(b) by 0 days.

(21) Appl. No.: 09/111,276

(22) Filed: Jul. 7, 1998

(30) Foreign Application Priority Data

Jul. 11, 1997 (EP) ............................................. 97305153

(51) Int. Cl.[7] ............................................. G06F 15/16
(52) U.S. Cl. ...................... 709/217; 709/227; 709/250
(58) Field of Search ................................ 709/217, 218, 709/227, 228, 239, 250; 701/213, 215

(56) References Cited

U.S. PATENT DOCUMENTS

| | | | |
|---|---|---|---|
| 5,095,480 A | | 3/1992 | Fenner |
| 5,572,528 A | | 11/1996 | Shuen |
| 5,732,074 A | * | 3/1998 | Spaur et al. ................. 370/313 |
| 5,737,414 A | * | 4/1998 | Walker et al. ................. 380/4 |
| 5,745,556 A | * | 4/1998 | Ronen ......................... 379/127 |
| 5,983,073 A | * | 11/1999 | Ditzik ......................... 455/11.1 |
| 6,035,281 A | * | 3/2000 | Crosskey et al. ............. 705/14 |
| 6,065,120 A | * | 5/2000 | Laursen et al. ............. 713/201 |
| 6,145,002 A | * | 11/2000 | Srinivasan ................... 709/225 |
| 6,169,897 B1 | * | 1/2001 | Kariya ......................... 455/426 |
| 6,202,008 B1 | * | 3/2001 | Beckert et al. ................ 701/33 |
| 6,611,740 B2 | * | 8/2003 | Lowrey et al. ................ 701/29 |

FOREIGN PATENT DOCUMENTS

| | | |
|---|---|---|
| DE | 4218804 A1 | 12/1993 |
| DE | 29608032 U1 | 8/1996 |
| EP | 0 365 885 | 5/1990 |
| EP | 0 510 789 | 10/1992 |
| EP | 0 575 678 | 12/1993 |
| EP | 0 648 027 | 4/1995 |
| GB | 2294132 A | 4/1996 |
| GB | 2 295 296 | 5/1996 |
| WO | WO 95/28747 | 10/1995 |
| WO | WO 96/03814 | 2/1996 |
| WO | WO 97/26750 | 7/1997 |

OTHER PUBLICATIONS

Jameel et al: "Internet Multimedia on Wheels" White Paper, Daimler–Benz, Palo Alto, California, May 1, 1997.
Media Information, Daimler–Benz Research and Technology previews first "internet on Wheels" technology, Palo Alto, CA, Apr. 30, 1997.
"Offline Online", ZDNet News, Oct. 22, 1996, http://www.zdnet.de/news.artikel/1996/10/22009–wc.htm.

(List continued on next page.)

Primary Examiner—Zarni Maung
(74) Attorney, Agent, or Firm—Davis Wright Tremaine LLP; Michael J. Donohue

(57) ABSTRACT

Internet access is provided to passengers in a vehicle such as an aircraft through a proxy server (10) which has access terminals (T1–n) for passengers' lap top computers or personal organisers (UT1–n). The proxy server (10) can be connected through a satellite link (2, 3) to a ground-based land station (5) connected to the Internet. In order to minimise use of the wireless link (2, 3), the proxy server, whilst the aircraft is in transit, is loaded with most frequently used web pages from a ground-based server (15), connected through terminals (14, 16) and a wired link (13). The downloaded web pages may be selected according to the destination of the journey. E-mail messages produced by the passengers may be temporarily stored until the aircraft lands and then downloaded to the server (15) for onward transmission.

34 Claims, 1 Drawing Sheet

OTHER PUBLICATIONS

"Middleware for a New Generation of Mobile Networks: The ACTS on the Move Project", Baumgarten H–G, Borrmann L., Köhler, T, Pink S, Lacoste G. Reichert F, INET '96.

"The Ultimate Taxi Trip in Aspen", Business Network by Amy Haimerl, Sep. 1996.

"Prefetching in World Wide Web", Zheng Wang, John Crowcroft, IEEE GLOBECOM, Nov. 18–22, 1996.

"A WWW–based Location–Dependent Information Service for Mobile Clients", Acharya A, Badrinath B R, Imielinski T, Navas J C, Jul. 17, 1995, http://www.cs.rutgers.edu/~navas/d...apers/loc_dep_mosaic/Overview.htm.

"Wireless Data Services", Sabnani K, Mar. 17, 1997, http://www.isi.edu/workshop/public_html/wmcw97/sabnani.html.

"Research in the Mobile Computing and Multi–media Lab", Apr. 26, 1995, http://www.cs.umd.edu/users/cldavis/test2.html.

"Walkstation II—Summary", Aug. 28, 1995, http://www.it.kth.se/labs/ccs/WS/ws.summary.html.

HTML 3.2 and CGI Unleashed, John December et al., Part 1, Sams.net Publishing, pp. 4–53, 1995.

* cited by examiner

TECHNIQUES FOR USING A WEB BASED SERVER PROVIDED IN A VEHICLE

FIELD OF THE INVENTION

The present invention relates to providing web access to a plurality of users in a vehicle, for example in a passenger vehicle such as an aircraft or ship, and has particular but not exclusive application to providing access to the Internet.

BACKGROUND

Access to computer networks such as the Internet and in particular the worldwide web, can now readily be achieved by mobile users through the use of lap top computers and modems, and more recently, personal organisers provided with Internet access software, such as a web browser.

It would be desirable to provide Internet access to passengers on vehicles such as aircraft or ships. This could be done simply by connecting all the users on the vehicle via a local network to a router on board the vehicle, which would send data across a wireless link via a satellite. However, this is an inherently costly solution because the wireless capacity is limited and usually expensive.

Proxy servers have been developed for local area networks to provide a common gateway from the network to the Internet. Thus, Internet traffic to the local area network is routed through a common gateway which caches all the pages that have been accessed by the users on the network, in order to reduce the delay to the user. For example, a proxy server is marketed by Microsoft Corporation. The proxy server has the advantage of reducing the bandwidth required for Internet access.

It would be possible to use a proxy server on a vehicle such as an aircraft but nevertheless the bandwidth of the satellite link would provide severe restrictions on the access time when a user accesses a web page through the satellite link.

The present invention seeks to overcome these difficulties.

SUMMARY OF THE INVENTION

In accordance with the invention from a first aspect there is provided a method of providing web access to a plurality of users in a vehicle, wherein the vehicle is provided with a web server for communication with the users, and means for providing a wireless link from the server to the web for use whilst the vehicle is in motion, the method comprising downloading into the web server in the vehicle, whilst it is stationary, at least one pre-selected web page to be accessed by the users during a journey in the vehicle.

Thus, in accordance with the invention, the web server in the vehicle can be selectively loaded with a number of web pages that are commonly accessed by users during a particular journey whilst the vehicle is stationary and in proximity to a large bandwidth, low cost data source. The downloaded pages may be selected according to the destination of the journey. In this way, large numbers of pages can be loaded onto the vehicle and access can be provided to the passengers without the need to make use of the wireless link, thereby optimising access time for the users.

In the event that the user wishes to access a web page which has not been downloaded onto the server on the vehicle, access to the appropriate web site can be provided through the wireless link. However, the number of occasions for which the wireless link needs to be used, is reduced substantially in accordance with the invention.

The web server in the vehicle may be operative to store e-mail messages produced by users during the journey, and the method includes transmitting the stored messages from the vehicle whilst it is stationary, so as to reduce the load on the wireless link during the journey.

Use of the wireless link may be subject to a charge, whereas access of data from the web server on the vehicle, during the journey, may be free of charge or priced at a lower rate than the wireless link. The web server may be operative to accumulate billing information relative to usage of the web through the wireless link, and the billing information may be downloaded from the server on the vehicle, when the vehicle is stationary. Use of the wireless link may be charged to a credit card account or other means of billing.

The wireless link may comprise a satellite link, for example making use of a satellite telecommunications system. One example of such a system is the ICO™ system, aspects of which are described in patent publications WO 95/28747, WO 96/03814 and GB 2 295 296A. Other examples include the Inmarsat™ satellite system as described in "Satellite Communications Principles and Applications" by Calcutt and Tetley, published 1994 by Edward Arnold, the Iridium™ satellite cellular system, described for example in EP-A-0365885, and the Odyssey™ system described for example in EP-A-0510789, EP-A-0575678 and EP-A-0648027.

The invention also includes a passenger vehicle provided with access to a web, comprising a proxy server, a local network within the vehicle to provide access to the proxy server for passengers in the vehicle, a transceiver for providing a wireless link from the proxy server to the web for use whilst the vehicle is in motion, and an input connection to permit the downloading into the proxy server, of preselected pages for access by the users during a journey in the vehicle.

Furthermore, the invention includes a device for downloading data into the proxy server of the vehicle, comprising a store of web pages categorised according to the destination of the vehicle, an output for downloading the pages into the proxy server in the vehicle, and user operable selecting means for inputting the vehicle's destination such that the pages categorised for the selected destination are downloaded into the proxy server.

From the foregoing, it can be seen that the invention may be broadly considered as a passenger vehicle provided with Internet access, comprising a proxy server, and a local network within the vehicle to provide access to the proxy server for passengers in the vehicle.

BRIEF DESCRIPTION OF THE DRAWINGS

In order that the invention may be more fully understood and embodiment thereof will now be described by way of example with reference to the accompanying drawings in which.

DETAILED DESCRIPTION

Figure 1:
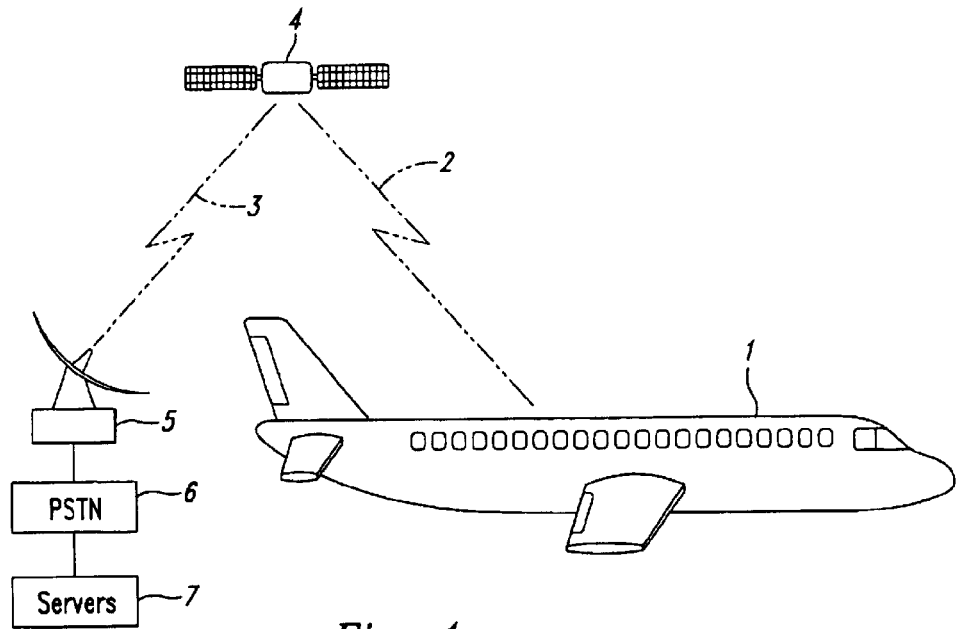
FIG. 1 is a schematic view of a passenger aircraft provided with Internet access, in accordance with the invention, with a wireless link provided via a satellite telecommunications system.

Referring to FIG. 1, a passenger aircraft 1 is provided with Internet access through a wireless link 2, 3 via a satellite 4 which forms part of a satellite communication system, for example the aforementioned ICO™ system. The wireless link comprises an uplink 2 to the satellite 4 and a downlink 3 to a satellite earth station 5 which is connected through a public switch telephone network (PSTN) 6 or a public switched public data network (PSPDN) not shown, to servers which provide web sites for the Internet in a manner well known per se. For a general review of the Internet, the worldwide web and hypertext mark up language which is used to support the web, reference is directed to HTML 3.2 & CGI Unleashed, John December and Mark Ginsburg, Part 1, pp 4–53, Sams.net Publishing 1996.

It will be understood that the Internet consists of a plurality of servers which support web sites that include a plurality of web pages. Web pages are identified by uniform resource locators (URLs) and links between various web pages can be established through hotspots on the individual web pages.

Users can access web pages using web browser software such as the Netscape browser or the Microsoft Explorer. This software is typically run on a user's personal computer connected to the Internet through a modem. For mobile users, a laptop PC and modem may be used. Alternatively, a personal organiser capable of running web browser software may be used for Internet connection. In addition, in a conventional manner, the mobile user apparatus may be used to send and receive e-mail messages.

As previously mentioned, it is known to provide a gateway from a local area network of PCs, to the Internet through a device known as a proxy server. The proxy server permits a single modem to be used to provide Internet access for all PCs connected to the local area network. Furthermore, the proxy server is configured to cache access web pages so that when a particular web is accessed on a second occasion, the previously cached version can be used in order to reduce the time taken to download the page. A typical example of a proxy server is the proxy server marketed by Microsoft Corporation.

Figure 2:
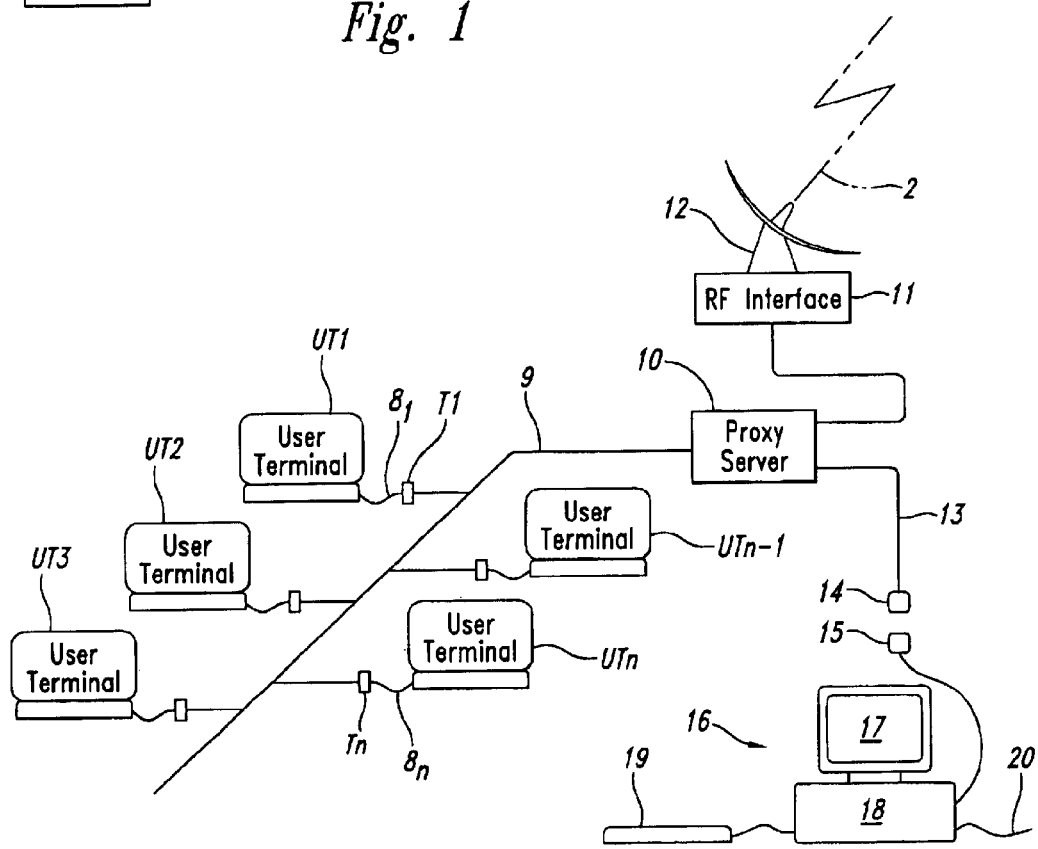
FIG. 2 is a schematic block diagram of a local area network provided on the vehicle shown in FIG. 1.

Referring now to FIG. 2, the aircraft includes an Internet access point in the rear of each passenger's seat in order to allow passengers to connect their lap top computers or personal organisers, hereinafter referred to as user terminals, to the Internet. In FIG. 2, user terminals UT1–UTn are shown connected via leads $8_1$–$8_n$ to terminal points T1–Tn to a local, cable connection 9 may comprise a coaxial cable, a twisted cable pair or alternatively an infrared connection or any other communication medium suitable for a local area network, known to those skilled in the art.

The proxy server 10 is connected to r.f. interface circuits 11 which drive a satellite antenna 12, which communicates with the satellite 4 shown in FIG. 1.

Also, the proxy server 10 is connected through a wired link 13 to an output terminal 14 which, when the aircraft is stationary on the ground, between flights, can be coupled through terminal 15 to a ground-based server 16. The ground based server 16 may comprise a personal computer which, in a conventional manner may include a display screen 17, a processor 18 including disc storage and a keyboard 19.

The store 18 of the ground-based server 16 stores web pages categorised according to the destination of the aircraft. The keyboard 19 can be used to select the web pages categorised for a particular destination. The selected web pages can then be downloaded into the proxy server 10 when the aircraft on the ground, in transit by connecting the terminal 15 to terminal 14 on the aircraft, to enable the selected web pages to be downloaded through the wired connection 14 to the proxy server.

When the aircraft is in flight, travelling towards the selected destination, individual users can connect their user terminals UT to the local area network on the aircraft, so as to be connected through relevant terminals T to the cabling 9 that is connected to the proxy server 10. The users can use the web browsers on their individual user terminals to select web pages stored in the proxy server 10. These web pages are available free of charge in this example. Also, if the users wish to access web pages at sites other than the proxy server 10, this can be achieved through the rf interface 11 and satellite antenna 12, making use of the wireless link 2, 3 through the satellite network, to the receiving station 5, which provides access to the servers 7 that form part of the Internet. However, because a large number of frequently used web pages, specific to the journey to the selected destination are loaded on the proxy server 10, demand by users for access through the wireless link 2, 3 is reduced, thereby reducing demand for bandwidth.

Additionally, the proxy server operates in the conventional manner to cache web pages accessed through the wireless link 2, 3 in order to minimise access time for subsequent re-use by any one of the users through the network 9.

When a user requests Internet access through the wireless link 2, 3, the proxy server 10 prompts the user for information concerning a credit card account so that the proxy server can accumulate billing information to be charged to the credit card account. When the aircraft lands, the billing information together with the credit card details are downloaded through the wired link 13 to the ground-based server 16, which subsequently downloads the billing information to credit card billing computers through link 20.

The described system also provides a novel way of handling e-mail messages. During the flight, the users, through their user terminals UT, can produce and send e-mail messages, which are temporarily stored in the proxy server 10. When the aircraft lands, the e-mail messages are downloaded through the wired link 13 to the server 16 on the ground, which subsequently downloads the e-mail messages through the conventional, ground-based link 20, for onward transmission.

The e-mail messages and web page requests may be allocated different priorities. For example, if an individual user, during the flight wishes to send an e-mail message with a high priority, the usual message storage facility will be overridden and the e-mail message will be sent via the wireless link, 2, 3, through the satellite network. Using the high priority facility would incur a charge to the user's credit card account.

Whilst the invention has been described in relation to a passenger aircraft, it will be understood that it is applicable to other vehicles, such as ships, trains and other public and private means of transport.

What is claimed is:

1. A method of providing web access to a plurality of users in a vehicle, the method comprising:

coupling an electronic device of each of a plurality of passengers to a server provided in the vehicle, the electronic devices being capable of displaying a web page;

transmitting a request for a selected web page from the server to a wide-area network (WAN) via a wireless communication link between the server and the WAN;

at the vehicle, receiving the selected web page, via the wireless link, in response to the transmission of a request for the selected web page;

storing the selected web page in the server; and distributing the selected web page to the electronic device of one of the plurality of passengers in the vehicle.

2. The method of claim 1, further comprising:

transmitting a plurality of requests for a plurality of web pages from the server to the WAN;

at the vehicle, receiving the plurality of web pages in response to the transmission of the request for the plurality of web pages;

storing the plurality of web pages in the server; and distributing the plurality of web pages to the electronic devices of a plurality of the passengers in the vehicle.

3. The method of claim 1 wherein transmitting the request for the selected web page from the server to the WAN occurs while the vehicle is stationary.

4. The method of claim 1 wherein distributing the selected web page to the electronic device of one of the plurality of passengers in the vehicle occurs while the vehicle is in motion.

5. The method of claim 1 wherein the wireless communication link is provided via a satellite.

6. The method of claim 1 wherein passenger requests for web pages are provided from the passenger electronic devices to the server for transmission from the server to the WAN wherein transmitting a request for the selected web page comprises transmitting passenger requests for web pages that are provided from the passenger electronic devices to the server.

7. The method of claim 6 wherein transmitting the request for the selected web page from the server to the WAN occurs while the vehicle is in motion.

8. The method of claim 6, further comprising storing passenger requests for web pages while the vehicle is in motion wherein transmitting the request for the selected web page from the server to the WAN occurs when the vehicle is stationary.

9. The method of claim 1 wherein the request for the selected web page from the server to the WAN requests a web page providing information related to a destination of the vehicle.

10. The method of claim 1, further comprising receiving, in the server in the vehicle, e-mail messages sent from the electronic devices of passengers.

11. The method of claim 10, further comprising transmitting the received e-mail messages from the server to the WAN via the wireless link.

12. The method of claim 11 wherein transmitting the received e-mail messages from the server to the WAN occurs while the vehicle is in motion.

13. The method of claim 11, further comprising storing the received email messages in the while the vehicle is in motion wherein transmitting the received e-mail messages from the server to the WAN occurs while the vehicle is stationary.

14. The method of claim 1 wherein the wireless link is provided through a satellite telephone network.

15. The method of claim 1, further comprising accumulating billing information relating to usage of the web through the wireless link and downloading the billing information from the server.

16. The method of claim 1, further comprising coupling the server to the WAN via a hardwired connection.

17. A system to provide web access to a plurality of users in a vehicle, comprising:

a plurality of terminal points configured to couple an electronic device of each of a plurality of passengers in the vehicle, respectively, to a web server provided in the vehicle, the electronic devices being capable of displaying a web page;

a server positioned within the vehicle and communicatively coupled to the electronic devices of the passengers via the respective terminal points;

a radio frequency transmitter on the vehicle and coupled to the server, the transmitter configured to transmit a request for a selected web page from the server to a wide-area network (WAN) via a wireless communication link established between the server and the WAN;

a radio frequency receiver on the vehicle and coupled to the server, the receiver configured to receive the selected web page, via the wireless link, in response to the transmission of a request for the selected web page; and a storage structure within the server to store the selected web page for subsequent distribution to the electronic device of one of the plurality of passengers in the vehicle via the terminal point.

18. The system of claim 17 wherein the terminal points are configured to receive a cable coupling the terminal point to the electronic devices of the passengers.

19. The system of claim 17, further comprising a wired link to couple the server to the WAN.

20. The system of claim 17 wherein the transmitter is configured to transmit a plurality of requests for a plurality of web pages from the server to the WAN, the receiver is configured to receive the plurality of web pages in response to the transmission of the request for the plurality of web pages, and the storage structure is configured to store the plurality of web pages in the server page for subsequent distribution to the electronic devices of the plurality of passengers in the vehicle via the terminal point.

21. The system of claim 17 wherein the transmitter is configured to transmit the request for the selected web page from the web server to the WAN occurs while the vehicle is stationary.

22. The system of claim 17 wherein the server is configured to distribute the selected web page to the electronic device of one of the plurality of passengers in the vehicle while the vehicle is in motion.

23. The system of claim 17 wherein the transmitter is configured for communication via a satellite to thereby establish the wireless communication link via the satellite.

24. The system of claim 17 wherein the receiver is configured for communication via a satellite to thereby establish the wireless communication link via the satellite.

25. The system of claim 17 wherein passenger requests for web pages are provided from the passenger electronic devices to the web server via the terminal points for transmission from the web server to the WAN wherein the transmitter is configured to transmit a request for the selected web page provided from the passenger electronic devices to the web server.

26. The system of claim 17 wherein the transmitter is configured to transmit the request for the selected web page from the web server to the WAN while the vehicle is in motion.

27. The system of claim 17 wherein the storage structure is further configured to store passenger requests for web pages while the vehicle is in motion wherein the transmitter if further configured to transmit the request for the selected web page from the web server to the WAN occurs when the vehicle is stationary.

28. The system of claim 17, wherein the storage structure is further configured to receive and store e-mail messages sent from the electronic devices of passengers.

29. The system of claim 28 wherein the transmitter is further configured to transmit the received e-mail messages from the web server, via the wireless link, to the WAN.

30. The system of claim 26 wherein the transmitter is configured to transmit the received e-mail messages from the web server to the WAN while the vehicle is in motion.

31. The system of claim 27 wherein the data storage structure is configured to store the received e-mail messages in the data storage structure while the vehicle is in motion, the transmitter being further configured to transmit the stored e-mail messages to the WAN occurs while the vehicle is stationary.

32. The system of claim 28 wherein the transmitter is configured for communication via a satellite to thereby establish the wireless communication link via the satellite.

33. The system of claim 28 wherein the receiver is configured for communication via a satellite to thereby establish the wireless communication link via the satellite.

34. The system of claim 17 wherein the server is configured to accumulate billing information relating to usage of the web through the wireless link and to download the billing information from the web server.

* * * * *